(12) United States Patent
Kordosky et al.

(10) Patent No.: US 7,214,256 B2
(45) Date of Patent: May 8, 2007

(54) SOLVENT EXTRACTION PROCESS

(75) Inventors: Gary A. Kordosky, Tucson, AZ (US); Hans Hein Steger, Santiago (CL)

(73) Assignee: Cognis Corporation, Ambler, PA (US)

( * ) Notice: Subject to any disclaimer, the term of this patent is extended or adjusted under 35 U.S.C. 154(b) by 0 days.

(21) Appl. No.: 10/631,299

(22) Filed: Jul. 31, 2003

(65) Prior Publication Data

US 2004/0103756 A1   Jun. 3, 2004

Related U.S. Application Data

(60) Provisional application No. 60/408,169, filed on Sep. 3, 2002.

(51) Int. Cl.
   *C22B 3/04* (2006.01)

(52) U.S. Cl. .................... 75/721; 75/743; 266/101; 266/171

(58) Field of Classification Search ............... 266/101, 266/171; 423/139, 24; 205/589; 75/721, 75/743
   See application file for complete search history.

(56) References Cited

U.S. PATENT DOCUMENTS

| | | | | |
|---|---|---|---|---|
| 3,429,694 A | * | 2/1969 | Lower | 423/24 |
| 3,697,400 A | * | 10/1972 | Pang et al. | 205/581 |
| 3,878,286 A | * | 4/1975 | Morin et al. | 423/24 |
| 4,028,462 A | | 6/1977 | Domic et al. | |
| 6,261,526 B1 | * | 7/2001 | Virnig et al. | 423/139 |
| 2001/0001650 A1 | * | 5/2001 | Duyvesteyn et al. | 423/139 |

* cited by examiner

*Primary Examiner*—Scott Kastler
(74) *Attorney, Agent, or Firm*—John F. Daniels; Arthur G. Seifert

(57) ABSTRACT

A circuit configuration for a metal solvent extraction plant comprising:
   A) an extraction section for extracting metal ions from an aqueous leach solution containing the metal ions with an organic solvent solution containing at least one metal extraction reagent, wherein the extraction section consists of three countercurrent extraction stages; and
   B) a stripping section consisting of one stripping stage for stripping the metal ions from the metal extraction reagent.

15 Claims, 2 Drawing Sheets

A 3 Extraction, 1 Strip Stage Configuration

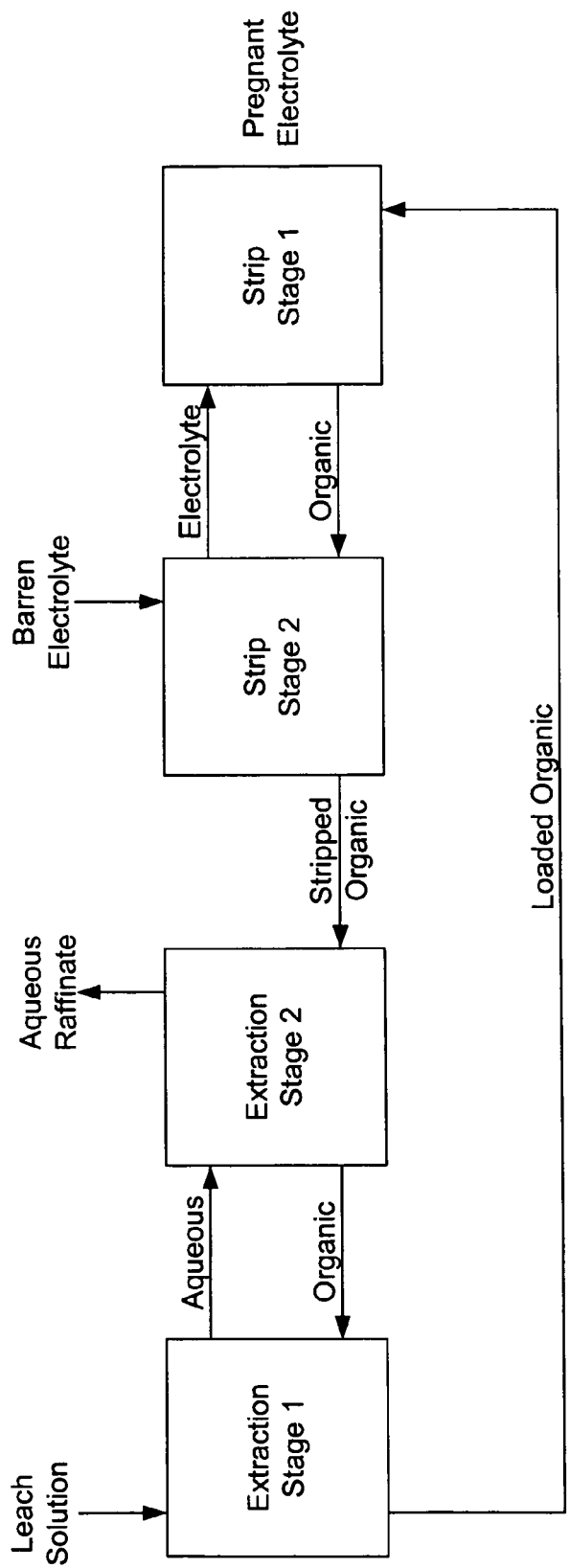
Figure 1. A 2 Extraction, 2 Strip Stage Configuration

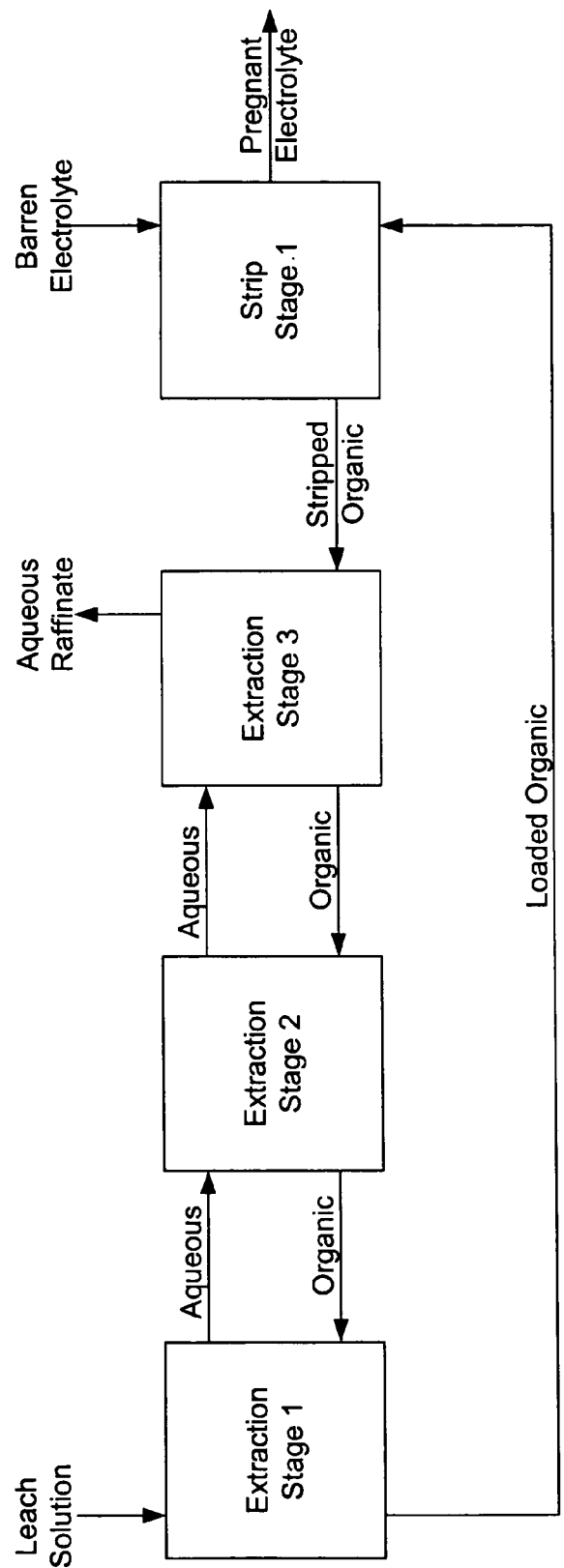
Figure 2. A 3 Extraction, 1 Strip Stage Configuration

SOLVENT EXTRACTION PROCESS

CROSS REFERENCE TO RELATED APPLICATIONS

This application claims the benefit of now abandoned provisional application serial No. 60/408,169, filed on Sep. 3, 2002.

FIELD OF THE INVENTION

This invention relates to a solvent extraction process for the recovery of metals from aqueous solutions.

BACKGROUND OF THE INVENTION

Solvent extraction is a widely used technology for the recovery of metals from aqueous solutions containing the metals.

One of the more common staging configurations in metal recovery is two extraction stages in combination with two strip stages for a total of four stages.

SUMMARY OF THE INVENTION

It has now been discovered that a staging arrangement employing three countercurrent extraction stages with one strip stage is more effective for the recovery of metal than the currently used staging arrangement of two extraction stages and two strip stages.

This new staging arrangement gives both higher metal recovery and more effective use of the organic phase and the metal extraction reagents present therein when the staging arrangements are compared under the exact same conditions.

Moreover, the present invention does not increase capital costs since the total number of stages and the size of the plants are exactly the same in both staging arrangements.

BRIEF DESCRIPTION OF THE DRAWINGS

FIG. 1 shows a known staging arrangement in which two extraction stages are present in combination with two stripping stages.

FIG. 2 shows the staging arrangement of the invention in which three extraction stages are present in combination with one strip stage.

DETAILED DESCRIPTION OF THE INVENTION

Other than in the operating examples, or where otherwise indicated, all numbers expressing quantities of ingredients or reaction conditions used herein are to be understood as modified in all instances by the term "about".

It should be noted that the present invention is not dependent on the particular metals present in the electrolyte solutions from which the metals are to be extracted. Also, different leach solutions can be used with respect to the metal ores. For example, nickel ores are typically leached with ammonia, extracted from the ammonia solutions, and stripped with acid to form an aqueous acidic electrolyte solution used in an electrowinning step.

The solvent extraction process (SX process) for extracting metals such as copper typically involves the following steps, (plus a wash stage), which result in electrolyte solutions used in electrowinning copper metal. Other processes that include solvent extraction and stripping can be employed in accordance with the invention with other metals such as nickel, zinc and the like to produce an electrolyte from which their respective metals are electrowon:

1. Aqueous acid leaching of copper ore using a strong acid to form an aqueous acid leach solution containing copper ions and often relatively small quantities of other metal ions. The aqueous leach acid solution dissolves salts of copper and other metals if present as it is contacted with the ore, e.g. as it trickles through the ore. The metal values are usually leached with aqueous sulfuric acid, producing a leach solution having a pH of 0.9 to 2.0.

2. The copper-pregnant aqueous acid leach solution is mixed in tanks with an oxime extraction reagent which is dissolved in a water-immiscible organic solvent, e.g., a kerosene or other hydrocarbons. The reagent includes the oxime extractant which selectively forms a metal-extractant complex with the copper ions in preference to ions of other metals. The step of forming the complex is called the extraction or loading stage of the solvent extraction process. The oxime extractants used in this step are typically oxime extractants of the hydroxyl aryl ketone oxime or hydroxy aryl aldoxime type, or a mixture thereof. Alkylated aryl hydroxyoximes such as alkylated acetophenone oximes and/or alkylated salicylaldoximes can be used e.g. 5-nonyl-2-hydroxy-acetophenone oxime and/or 5-nonyl-salicylaldoxime.

3. The outlet of the mixer tank can continuously feed to a large settling tank or equivalent equipment, where the organic solvent (organic phase), now containing the copper-extractant complex in solution, is separated from the partially depleted aqueous acid leach solution (aqueous phase). This part of the process is called phase separation. However, the tanks used in step 2 can be mixer/settler tanks so that step 3 is not required.

4. After extraction, the partially depleted aqueous acid leach solution (raffinate) is either recycled for further leaching, or recycled with a bleed, or discharged.

5. The loaded organic phase containing the dissolved copper-extractant complex is fed to another mixer tank, preferably a stripper/settler tank, where it is mixed with an aqueous strip solution of more concentrated sulfuric acid. The highly acid strip solution breaks apart the copper-extractant complex and permits the purified copper to pass and concentrate in the strip aqueous phase. The process of breaking the copper-extractant complex is called the stripping stage.

6. As in the extraction process described above (steps 2 and 3), the mixture of stripped organic phase and copper pregnant aqueous acid strip solution can be fed to another settler tank for phase separation, or to another type of solvent extraction equipment that replaces the traditional stripper/settler tank. However, phase separation preferably takes place in the stripper/settler tank in step 5.

7. From the stripper/settler tank, the regenerated stripped organic phase is recycled to the extraction mixer to begin extraction again, and the copper is recovered from the strip aqueous phase, customarily by feeding the strip aqueous phase to an electrowinning tankhouse, where the copper metal values are deposited on plates by a process of electrodeposition.

8. After recovering the copper values from the aqueous solution by electrodeposition, the solution, known as spent electrolyte, is returned to the stripping mixer to begin stripping again.

In the known process, set forth schematically in FIG. 1, Leach Solution from step 1 above enters Extraction Stage 1 where it is mixed with Organic (the water-immiscible organic solvent containing the oxime extraction reagent) from Extraction Stage 2. Loaded Organic (which is the organic solvent containing the copper-extractant complex in solution) exits Extraction Stage 1 and is sent to Strip Stage 1, where it is contacted with Electrolyte (aqueous acid strip solution) from Strip Stage 2. Pregnant electrolyte (containing the copper) is removed for use in electrowinning the copper. Organic (containing the oxime extraction reagent and remaining copper-extractant complex) exits Strip Stage 1 and enters Strip Stage 2, where it is contacted with Barren Electrolyte (strip electrolyte) for further stripping of copper from the remaining copper-extractant complex. Stripped Organic containing the oxime extractant is sent to Extraction Stage 2 where Aqueous (leach solution still containing some copper in solution) from Extraction Stage 1 is further extracted. Aqueous Raffinate (depleted aqueous acid leach solution) is removed from Extraction Stage 2.

In the process of the present invention, set forth schematically in FIG. 2, Leach Solution enters Extraction Stage 1, where it is mixed with Organic from Extraction Stage 2. Loaded Organic exits Extraction Stage 1 and enters the Strip Stage where it is contacted with Barren Electrolyte. Pregnant Electrolyte exits the Strip Stage for further processing by electrowinning. Stripped Organic leaves the Strip Stage and enters Extraction Stage 3, where it is contacted with Aqueous (partially extracted leach solution) from Extraction Stage 2. Aqueous Raffinate is removed from Extraction Stage 3. Organic from Extraction Stage 3 is sent to Extraction Stage 2, where it is contacted with Aqueous from Extraction Stage 1.

In the circuit configuration of the invention, it is to be understood that the circuit configuration shown in FIG. 2 can be used in one or more trains, depending on the size of the plant. Also, the circuit configuration shown in FIG. 2 can be used with one or more wash stages, preferably a single wash stage.

The invention will be illustrated but not limited by the following examples.

EXAMPLES

Example 1

This example compares a copper solvent extraction circuit having 2 extraction stages and 2 stripping stages (2E, 2S) with a copper solvent extraction circuit having 3 extraction stages and 1 strip stage (3E, 1S). An extraction isotherm was generated using an organic solution 0.296 molar in 5-nonyl-2-hydroxyacetophenone oxime (ketoxime) and 0.0964 molar in 5-nonylsalicylaldoxime (aldoxime) in a hydrocarbon diluent. The aqueous copper leach solution contained 6.36 g/l Cu and 150 g/l sulfate ion as sodium sulfate at a pH of 1.67. The above organic solution was first contacted several times with an aqueous solution having about 39 g/l Cu and 168 g/l sulfuric acid to obtain a preliminary stripped organic phase containing 1.37 g/l Cu. This preliminary stripped organic phase was then contacted vigorously with the copper leach solution at various organic to aqueous (O/A) ratios for sufficient time to obtain equilibrium. The resulting equilibrated organic phases were analyzed by atomic absorption for copper and iron while the resulting equilibrium aqueous phases were analyzed by atomic absorption for copper only. The results are given in Table 1 below.

TABLE 1

| Approximate O/A ratio | Aqueous Phase g/l Cu | Organic Phase g/l Cu | ppm Fe |
|---|---|---|---|
| 10 | 0.17 | 1.98 | 1.0 |
| 5 | 0.20 | 2.56 | 3.2 |
| 2 | 0.42 | 4.27 | 3.1 |
| 1.5 | 0.53 | 4.99 | 2.6 |
| 1 | 0.90 | 6.61 | 2.1 |
| 0.5 | 2.24 | 9.40 | 1.7 |
| 0.2 | 4.30 | 11.51 | 1.1 |

The isotherm data was inserted into the Cognis Corporation Isocalc computer program which predicts with great accuracy the results that can be obtained in a continuous copper solvent extraction plant provided correct mixer efficiencies for the extraction stages are used. For this Example 1, the following mixer efficiencies were used: 95% for extraction stage 2 and 92% for extraction stage 1 in the 2E, 2S circuit and 95% for extraction stage 3, 92% for extraction stage 2 and 89% for extraction stage one in the 3E, 1S circuit. These mixer efficiencies are consistent with mixer efficiencies that are obtained in the 2E, 2S circuit and which can be obtained in a 3E, 1S circuit of the invention in modern copper solvent extraction plants. The stripped organic values that were used in the Cognis Isocalc computer program were obtained by equilibrating the organic with an aqueous solution to give a copper stripped organic value circuit is representative for either one or two stripping stages depending on the particular circuit simulation. In this example two sets of stripping conditions were used. In the first set of results the barren stripping solution had 35 g/l Cu and 180 g/l sulfuric acid building to a pregnant strip solution of about 50 g/l Cu and 157 g/l sulfuric acid. In the second set of results the barren stripping solution had 35 g/l Cu and 150 g/l sulfuric acid building to a pregnant strip solution of about 50 g/l Cu and 127 g/l sulfuric acid. Simulated circuits were run with the computer program at various advance organic/aqueous (O/A) ratios to compare the results obtained with 3 extraction and 1 stripping stage verses the results obtained with 2 extraction and 2 stripping stages.

The results of the computer simulations are shown below in Table 2.

TABLE 2

| Set | Staging | Strip Organic g/l Cu | Advance O/A extraction | Copper Recovery | Net Transfer g/l Cu/Vol % |
|---|---|---|---|---|---|
| 1a | 2E, 2S | 1.42 | 1.0 | 95.0% | 0.276 |
| 1b | 2E, 2S | 1.42 | 0.71 | 90.2% | 0.369 |
| 1c | 2E, 2S | 1.42 | 0.63 | 86.8% | 0.40 |
| 1d | 3E, 1S | 2.16 | 1.0 | 96.6% | 0.28 |
| 1e | 3E, 1S | 2.16 | 0.63 | 90.7% | 0.418 |
| 2a | 2E, 2S | 1.83 | 1.0 | 94.1% | 0.273 |
| 2b | 2E, 2S | 1.83 | 0.76 | 90.2% | 0.345 |
| 2c | 2E, 2S | 1.83 | 0.70 | 88.2% | 0.366 |
| 2d | 3E, 1S | 2.84 | 1.0 | 95.2% | 0.276 |
| 2e | 3E, 1S | 2.84 | 0.70 | 90.7% | 0.376 |

As can be seen from this example a circuit having 3 extraction and 1 strip stage will result in higher copper recovery than a circuit having 2 extraction and 2 strip stages when the circuits are compared under exactly the same conditions. For example compare 1d (96.6% Cu recovery) with 1a (95.0% Cu recovery) and 1e (90.7% Cu recovery) with 1c (86.8% Cu recovery). Also compare 2d (95.2% Cu recovery) with 2a (94.1% Cu recovery) and 2e (90.7% Cu recovery) with 2c (88.2% Cu recovery). In addition note that the Net Transfer (g/l Cu/vol %) of the reagent is higher in the 3E, 1S staging than in the comparable 2E, 2S staging, showing that the reagent is used more efficiently in the 3E, 1S staging than in the 2E, 2S staging.

When taken in the context of large modern copper solvent extraction plants a 1% increase in copper recovery can add substantial revenue. For example consider a copper solvent extraction plant producing 100,000 tons of copper annually. An extra 1% recovery results in an additional 1,000 tons of copper which has a value of about US $1.5 million at a copper price of US $1500 ton. An additional 4% copper recovery adds US $6 million in revenue.

A second aspect of the 3E, 1 S stage configuration that is a favorable over the 2E, 2S stage configuration is enhanced copper over iron (Cu/Fe) selectivity. This can be noted by comparing the Cu/Fe transfer for the loaded organic for some of the 2E, 2S sets with the Cu/Fe transfer for the loaded organic for similar 3E, 1S sets. First the iron loading on the organic phase for each isotherm point is plotted against the copper loading for the same point. This gives a graph that can be used to find the iron loading of the organic phase for any copper loading of the same organic phase. For the sets in Table 2 the copper content of the loaded organic is obtained from the computer simulated circuit run and then the iron loading for that copper loaded organic can be obtained from the graph of iron loading against copper loading. This data for some of the sets in Table 2 is given in Table 3.

TABLE 3

| Set | Staging | Advance O/A Extraction | Copper Recovery | Stripped Organic g/l Cu | Loaded Organic g/l Cu | Loaded Organic ppm Fe | Cu/Fe Selectivity |
|---|---|---|---|---|---|---|---|
| 1a | 2E, 2S | 1.0 | 95.0% | 1.42 | 7.46 | 1.98 | 3050 |
| 1c | 2E, 2S | 0.63 | 86.8% | 1.42 | 10.18 | 1.50 | 5840 |
| 1d | 3E, 1S | 1.0 | 96.5% | 2.16 | 8.30 | 1.85 | 3320 |
| 1e | 3E, 1S | 0.63 | 90.7% | 2.16 | 11.32 | 1.17 | 7830 |
| 2a | 2E, 2S | 1.0 | 94.1% | 1.83 | 7.81 | 1.95 | 3070 |
| 2c | 2E, 2S | 0.7 | 88.2% | 1.83 | 9.84 | 1.60 | 5010 |
| 2d | 3E, 1S | 1.0 | 95.2% | 2.84 | 8.89 | 1.80 | 3360 |
| 2e | 3E, 1S | 0.7 | 90.7% | 2.84 | 11.08 | 1.25 | 6600 |

The Cu/Fe selectivity is calculated as follows. The copper transfer of the organic phase is divided by the iron loading of the loaded organic phase [(Loaded Organic Cu—Stripped Organic Cu)/Loaded Organic Fe]. The data in Table 3 shows that for any set of comparable conditions the 3E, 1S stage configuration shows better copper/iron (Cu/Fe) selectivity than the 2E, 2S stage configuration. For example compare set 1a with set 1d, set 1c with set 1e, set 2a with set 2d and set 2c with set 2e. The higher Cu/Fe selectivity of the 3E, 1S stage configuration over the 2E, 2S stage configuration provides an added advantage for the 3E, 1S staging configuration over the 2E, 2S configuration.

Example 2

In a manner similar to Example 1, Example 2 also compares a copper solvent extraction circuit having 2 extraction stages and 2 stripping stages (2E, 2S) with a copper solvent extraction circuit having 3 extraction stages and 1 strip stage (3E, 1 S). In this case the copper content of the leach solution was 61.37 g/l Cu at a pH of 1.8. This leach solution is representative of a concentrate leach solution. Two extraction isotherms were generated, one with 32 volume % LIX 84-I in a hydrocarbon diluent and one with 32 volume % LIX 984N reagent in a hydrocarbon diluent. LIX 84-I is a copper solvent extraction reagent available from Cognis Corporation of Gulph Mills, Pa., whose active copper extractant is 5-nonyl-2-hydroxyacetophenone oxime at a concentration of 1.54 molar. LIX 984N is a copper solvent extraction reagent available from Cognis Corporation whose active extractants are 5-nonyl-2-hydroxyacetophenone oxime (0.77 molar) and 5-nonylsalicylaldoxime (0.88 molar). The respective organic solutions were contacted vigorously with the copper leach solution at various organic to aqueous (O/A) ratios for sufficient time to obtain equilibrium. The resulting equilibrated organic phase and aqueous phases were analyzed by atomic absorption for copper. The results are set forth in Table 4 below.

TABLE 4

| Approximate O/A ratio | 32 V/V % LIX 84-I | | 32 V/V % LIX 984N | |
|---|---|---|---|---|
| | Aqueous g/l Cu | Organic g/l Cu | Aqueous g/l Cu | Organic g/l Cu |
| 20 | 13.16 | 2.46 | 3.56 | 3.00 |
| 10 | 18.64 | 4.38 | 7.41 | 5.67 |
| 5 | 25.08 | 7.31 | 14.91 | 9.56 |
| 3 | 31.66 | 9.85 | 24.21 | 12.64 |
| 2 | 36.33 | 11.61 | 31.49 | 14.65 |
| 1 | 45.97 | 14.40 | 43.41 | 16.80 |
| 2/3 | 51.62 | 16.15 | 50.88 | 17.77 |
| 1/2 | 54.37 | 16.54 | 53.87 | 18.12 |
| 1/3 | 56.52 | 16.76 | 56.08 | 18.27 |

In a manner similar to that described in Example 1, the isotherm data for each reagent in Table 4 was inserted into the Cognis Isocalc computer modeling program to predict with good accuracy the copper recovery expected in a continuous copper solvent extraction circuit when using the respective reagents at 32 volume % to treat the concentrate leach solution of this example. The following mixer efficiencies were used: 98% for extraction stage 2 and 95% for extraction stage 1 in the 2E, 2S circuits and 98% for extraction stage 3, 96% for extraction stage 2 and 95% for extraction stage one in the 3E, 1 S circuits. These mixer efficiencies are consistent with mixer efficiencies that are obtained in the 2E, 2S circuit and which can be obtained in a 3E, 1S circuit of the invention in modern copper solvent extraction plants operating at temperatures of about 35° C. which is the temperature at which concentrate leach solutions will enter the copper solvent extraction plant. The stripped organic values that were used in the computer modeled circuit for LIX 84-I are consistent with stripped organic values that are obtained in operating copper solvent extraction plants when the barren strip solution has 30 g/l Cu and 168 g/l sulfuric acid and the pregnant strip solution has about 45 g/l Cu and 146 g/l sulfuric acid. The stripped organic values that were used for LIX 984N are consistent with the stripped organic values that are obtained in a plant when the barren strip solution has 35 g/l Cu and 180 g/l acid and the pregnant strip solution has 45 g/l Cu and 165 g/l sulfuric acid.

The results of the computer simulations are shown below in Table 5.

TABLE 5

| Set | Reagent | Staging | Strip Organic g/l Cu | Advance O/A extraction | Copper Recovery | Net Transfer g/l Cu/Vol % |
|---|---|---|---|---|---|---|
| 1a | LIX 84-I | 2E, 2S | 0.88 | 4.0 | 67.2% | 0.321 |
| 1b | LIX 84-I | 3E, 1S | 1.33 | 3.2 | 67.3% | 0.404 |
| 2a | LIX 984N | 2E, 2S | 3.61 | 4.63 | 80.0% | 0.331 |
| 2b | LIX 984N | 3E, 1S | 4.73 | 4.09 | 80.0% | 0.375 |

In sets 1a and 1b the objective was to obtain about 67% copper recovery. It can be noted that the organic flow rate needed to obtain the desired copper recovery with the 2E, 2S staging (set 1a) is about 25% greater than the flow rate needed to obtain the same copper recovery with set 1b (the 3E, 1S staging) [(4.0–3.2)/3.2×100%]. This means that the mixer/settler tanks in a plant using the 2E, 2S staging would have to be 25% larger in size than the mixer/settler tanks in a plant using the 3E, 1staging. Thus a plant with 2E, 2S staging would have a higher capital cost by about 25% which is quite significant. For example, the cost to install a mixer/settler tank is about US $400 per square foot of settler area on a fully prepared site. Considering that large modern copper solvent extraction plants might have settlers that are 90 feet long and 90 feet wide, a single mixer settler unit of this size would cost about US $3.24 million without considering site preparation costs. If each mixer settler unit needed to be 25% larger the cost would be 4.05 million dollars per mixer settler unit giving a total increase in capital for the 2E, 2S stage configuration of US $3.24 million over the 3E, 1S stage configuration.

If the site preparation costs are high, and they often are because of the location of copper plants, the savings for the smaller 3E, 1S plant will be even greater.

In sets 2a and 2b, the objective was to recover 80% of the copper. It can be seen that the organic flow needed to obtain 80% copper recovery with the 2E, 2S staging is about 13.2% greater than the organic flow needed to obtain 80% copper recovery with the 3E, 1S staging [(4.63–4.09/4.09)×100%]. This means that the mixer/settler tanks in a plant with the 2E, 2S staging would need to be about 13.2% larger then the mixer/settler tanks needed for a plant with 3E, 1S staging. Again this would result in a significant capital savings for the 3E, 1S configuration.

In both set 1 and set 2 of this Example 2, the copper net transfer of the reagent is greater for the 3E, 1S staging over the comparable 2E–2S staging. This shows that the reagent is used more effectively in a plant having 3E, 1 S staging when compared to a plant having 2E, 2S staging.

Example 3

In a manner similar to Examples 1 and 2, this Example 3 compares a copper solvent extraction circuit having 2 extraction stages and 2 stripping stages (2E, 2S) with a copper solvent extraction circuit having 3 extraction and 1 strip stage (3E, 1S). In this example the copper content of the leach solution is 4.57 g/l Cu at a pH of 1.8. This leach solution is representative of heap leach solutions commonly found in copper heap leaching operations. An extraction isotherm was generated with a solution of 0.225 molar 5-nonyl-2-hydroxyacetophenone oxime in a hydrocarbon diluent. The respective organic solution was contacted vigorously with the copper leach solution at various organic to aqueous (O/A) ratios for sufficient time to obtain equilibrium.

The resulting equilibrated organic phases and aqueous phases were analyzed by atomic absorption for copper. The results are given in Table 6 below.

TABLE 6

| Approximate O/A ratio | Aqueous Phase g/l Cu | Organic Phase g/l Cu |
|---|---|---|
| 10 | 0.039 | 0.481 |
| 5 | 0.08 | 0.945 |
| 3 | 0.14 | 1.56 |
| 2 | 0.22 | 2.31 |
| 1.5 | 0.31 | 3.01 |
| 1 | 0.52 | 4.3 |
| 0.67 | 0.98 | 5.74 |
| 0.5 | 1.49 | 6.59 |
| 0.2 | 3.15 | 7.70 |

In a manner similar to that described in Examples 1 and 2 the isotherm data in Table 6 was inserted into the Cognis Isocalc computer modeling program to predict with good accuracy the copper recovery expected in a continuous copper solvent extraction circuit when using the organic solution of this example. The following mixer efficiencies were used: 94% for extraction stage 2 and 90% for extraction stage 1 in the 2E, 2S circuits and 95% for extraction stage 3, 91% for extraction stage 2 and 88% for extraction stage one in the 3E, 1S circuits. These mixer efficiencies are consistent with mixer efficiencies obtained for 2E, 2S circuits and which can be obtained in a 3A, 1S circuit in modern commercial copper solvent extraction plants using a reagent of this type operating at temperatures of about 22° C. which is a common temperature for heap leach solutions entering a copper solvent extraction plant. The stripped organic values that were used in the computer modeling program are consistent with stripped organic values that are obtained in operating copper solvent extractions plants when the barren strip solution has 35 g/l Cu and 180 g/l acid and the pregnant strip solution has 50 g/l Cu and 157 g/l sulfuric acid.

The results of the computer simulation are shown in Table 7 below.

TABLE 7

| Set | Reagent | Staging | Strip Organic g/l Cu | Advance O/A extraction | Copper Recovery | Net Transfer g/l Cu/Vol % |
|---|---|---|---|---|---|---|
| 1a | LIX 84-I | 2E, 2S | 0.31 | 0.645 | 90.1% | 0.437 |
| 1b | LIX 84-I | 2E, 2S | 0.31 | 0.85 | 95.0% | 0.35 |
| 2a | LIX 84-I | 3E, 1S | 0.56 | 0.573 | 90.1% | 0.49 |
| 2b | LIX 84-I | 3E, 1S | 0.56 | 0.64 | 95.1% | 0.465 |

In sets 1a and 2a the objective was to obtain about 90% copper recovery. It should be noted that the organic flow rate needed to obtain the desired copper recovery with the 2E, 2S staging (set 1a) is about 12.5% greater than the flow rate needed to obtain the same copper recovery with set 2a (the 3E, 1S staging) [(0.645–0.573)/0.573×100%]. This means that the reagent in the 3E, 1S stage configuration is about 12.5% more efficient than that same reagent in 2E, 2S stage configuration. The increased net transfer of the reagent in the 3E, 1S staging also shows that the reagent is more efficient with 3E, 1S staging when compared to the 2E, 2S staging.

In sets 1b and 2b the objective was to obtain about 95% copper recovery. It should be noted that the organic flow rate needed to obtain the desired copper recovery with the 2E, 2S staging (set 1 a) is about 32.8% greater than the flow rate needed to obtain the same copper recovery with set 2a (the 3E, 1S staging) [(0.85−0.64)/0.64×100%]. In this case the efficiency of the organic phase in the 3E, 1S stage configuration is about 32.8% greater than the efficiency of the same organic phase in a 2E, 2S stage configuration. The much higher net transfer of the reagent in set 2b compared to set 1b confirms the higher efficiency of the 3E, 1S stage configuration.

In a plant with 2 extraction stages and 2 strip stages, a design that has been used commonly in the past, running under the conditions of set 1 a achieving 90.1% copper recovery which is a copper recovery that is often the basis for the design of copper solvent extraction plants, a simple change in the piping of the plant to a 3E, 1S configuration would allow the plant to achieve 95.1% copper recovery with all other conditions being the same (set 2b).

Example 4

In a manner similar to the previous examples, this example compares a copper solvent extraction circuit having 2 extraction stages and 2 stripping stages (2E, 2S) with a copper solvent extraction circuit having 3 extraction and 1 strip stage (3E, 1 S). In this Example 4 the leach solution has 5.97 g/l Cu, 2.7 g/l Fe at a pH of 2.0. The organic solution contained about 0.194 molar 5-nonyl-2-hydroxyacetophenone oxime, about 0.189 molar 5-nonylsalicylaldoxime and about 28.2 g/l of the equilibrium modifier dodecanone all in the hydrocarbon diluent SHELLSOL™ D70. The respective organic solution was contacted vigorously with the copper leach solution at various organic to aqueous (O/A) ratios for sufficient time to obtain equilibrium. The resulting equilibrated organic phases were analyzed for copper and iron while the aqueous phases were analyzed for copper. Analysis was by atomic absorption. The results are given in Table 8 below.

TABLE 8

| Approximate O/A ratio | Aqueous Phase g/l Cu | Organic Phase g/l Cu | Organic Phase ppm Fe |
|---|---|---|---|
| 1.5 | 0.21 | 4.25 | — |
| 1 | 0.42 | 6.11 | 8.6 |
| 2/3 | 1.00 | 8.31 | 4.6 |
| 0.5 | 1.70 | 9.51 | 3.2 |
| 1/3 | 2.87 | 10.52 | 2.6 |
| 0.25 | 3.62 | 10.97 | 2.5 |
| 1/6 | 4.41 | 11.28 | 2.6 |
| 1/8 | 4.78 | 11.51 | 2.8 |
| 1/10 | 5.03 | 11.55 | 3.0 |

In a manner similar to that described in Examples 1–3 above, the isotherm data in Table 8 was inserted into the Cognis Isocalc computer modeling program to predict with good accuracy the copper recovery expected in a continuous copper solvent extraction circuit when using the organic solution of this Example 4. The following mixer efficiencies were used: 94% for extraction stage 2 and 90% for extraction stage 1 in the 2E, 2S circuits and 95% for extraction stage 3, 91% for extraction stage 2 and 88% for extraction stage one in the 3E, 1S circuits. These mixer efficiencies are consistent with mixer efficiencies for 2E, 2S circuits and which can be obtained in a 3E, 1S circuit in modern copper solvent extraction plants using a reagent of this type operating at a temperature of about 22° C. The stripped organic values that were used in the computer modeled circuit are consistent with stripped organic values that are obtained in operating copper solvent extraction plants when the barren strip solution has 35 g/l Cu and 180 g/l acid and the pregnant strip solution has 50 g/l Cu and 157 g/l sulfuric acid. The results of the computer simulations are shown in Table 9.

TABLE 9

| Set | Staging | Strip Organic g/l Cu | Advance O/A extraction | Copper Recovery | Net Transfer g/l Cu/Vol % |
|---|---|---|---|---|---|
| 1a | 2E, 2S | 1.95 | 1.0 | 96.2% | 0.267 |
| 1b | 3E, 1S | 2.57 | 1.0 | 97.7% | 0.271 |
| 2a | 2E, 2S | 1.95 | 0.68 | 91.0% | 0.372 |
| 2b | 3E, 1S | 2.57 | 0.68 | 94.9% | 0.387 |

In sets 1a and 1b the objective was to predict the copper recovery for the respective stage configuration when the advance organic/aqueous (O/A) flow across extraction is 1.0. It should be noted that the circuit having a 3E, 1S stage configuration achieves a higher copper recovery than the circuit having a 2E, 2S stage configuration.

In sets 2a and 2b the objective was to compare the 2E, 2S stage configuration with the 3E, 1 S stage configuration when the advance O/A is set to achieve about 95% copper recovery in the 3E, 1 S stage configuration. Note that under conditions where the 3E, 1S configuration achieves about 95% copper recovery the 2E, 2S stage configuration only achieves about 91% copper recovery, all other conditions being the same.

Now as in Example 1, compare the Cu/Fe selectivity for the 2E, 2S sets in Table 9 with the Cu/Fe selectivity for similar 3E, 1S sets in Table 9. As in Example 1, the iron loading in the organic phase for each isotherm point is plotted against the copper loading for the same point. The resulting graph was then used to obtain an iron loading for any copper loading of the organic phase. For the sets in Table 9, the loaded organic was obtained from the computer simulated circuit run and then the iron loading for that copper loaded organic was obtained from the graph of iron loading verses copper loading. This Cu/Fe selectivity data for the sets in Table 9 is given in Table 10 below.

TABLE 10

| Set | Staging | Advance O/A Extraction | Copper Recovery | Stripped Organic g/l Cu | Loaded Organic g/l Cu | Loaded Organic ppm Fe | Cu/Fe Selectivity |
|---|---|---|---|---|---|---|---|
| 1a | 2E, 2S | 1.0 | 96.2% | 1.95 | 7.70 | 5.35 | ~1100 |
| 1b | 3E, 1S | 1.0 | 97.7% | 2.57 | 8.40 | 4.35 | ~1300 |
| 2a | 2E, 2S | 0.68 | 91.0% | 1.95 | 9.94 | 2.85 | ~2800 |
| 2b | 3E, 1S | 0.68 | 94.9% | 2.57 | 10.90 | 2.50 | ~3300 |

As discussed in Example 1, Cu/Fe selectivity was calculated by dividing the copper transfer of the organic phase by the iron loading on the loaded organic phase [(Loaded Organic Cu—Stripped Organic Cu)/Loaded Organic Fe]. The data in Table 10 shows that for comparable conditions the 3E, 1S stage configuration results in higher Cu/Fe selectivity than the 2E, 2S stage configuration. For example, compare set 1a with set 1b, and set 2a with set 2b. The higher Cu/Fe selectivity of the 3E, 1S stage configuration over the 2E, 2S stage configuration provides an added advantage of the 3E, 1S staging configuration over the 2E, 2S configuration.

What is claimed is:

1. A circuit configuration for a metal solvent extraction plant comprising:
   A) an extraction section for extracting metal ions from an aqueous leach solution containing the metal ions with an organic extraction solution containing at least one metal extraction reagent, wherein the extraction section consists of three countercurrent extraction stages in which the metal-containing aqueous leach solution to be extracted enters at an extraction stage 1, progresses to an extraction stage 2 and then to an extraction stage 3 where it exits as metal-depleted aqueous raffinate and the organic extraction solution enters extraction stage 3 progresses to extraction stage 2 and then to extraction stage 1 where it exits as a fully loaded organic solution; and
   B) a stripping section consisting of one stripping stage for stripping the metal ions from the fully loaded organic solution from extraction stage 1, thereby providing a stripped organic extraction solution which is recycled to extraction stage 3 and an aqueous solution containing the metal ions which have been stripped from the loaded organic solution.

2. The circuit configuration of claim 1 wherein the solvent extraction circuit also comprises a wash or scrubbing stage.

3. A method for increasing the metal recovery from a metal-containing aqueous leach phase containing the metal to be recovered by an organic phase containing an extraction reagent in a metal solvent extraction plant that comprises two extraction stages, one and two, connected in series with countercurrent flow between the metal containing aqueous phase, which enters at extraction stage one, and an organic phase, which enters at extraction stage two, in combination with two shipping stages for stripping the metal extracted by the organic phase and recycling the stripped organic phase to extraction stage two, the method, comprising reconfiguring the plant to contain three countercurrent extraction stages, one, two and three, connected in series with countercurrent flow between the aqueous leach phase, which enters at extraction stage one and exits at extraction stage three as metal-depleted ruffinate, and the organic phase, which enters at extraction stage three as stripped organic and exits at extraction stage one as loaded organic, in combination with only one stripping stage to strip the metal from the loaded organic from extraction stage one, thereby producing a stripped organic and an aqueous solution containing metal ions which have been stripped from the loaded organic solution.

4. The method of claim 3 wherein the metal solvent extraction plant is a copper metal solvent extraction plant.

5. In a metal solvent extraction plant for extracting metal from a metal-containing aqueous phase, wherein the plant contains an extraction section for extracting metal ions from said aqueous phase using a substantially water-immiscible organic solvent containing at least one metal extraction reagent, and a stripping section for stripping the metal ions from the metal extraction reagent, the improvement comprising combining an extraction section which consists of three countercurrent extraction stages in which the metal-containing aqueous phase enters at an extraction stage 1, progresses to an extraction stage 2 and then to an extraction stage 3 where it exits as metal-depleted aqueous rafinate and the organic extraction solution enters at extraction stage 3, progresses to extraction stage 2, and then to extraction stage 1 where it exits as a fully loaded organic solution, with a stripping section which consists of only one stripping stage for stripping the metal ions from the fully loaded organic solution from extraction stage 1, thereby providing a skipped organic extraction solution which is recycled to extraction stage 3 and an aqueous solution containing the metal ions which have been stripped from the loaded organic solution.

6. A solvent extraction process for extracting metals from a metal-containing aqueous phase using an organic extraction solution comprising a water-inmiiscible organic solvent containing a metal extraction reagent, comprising the steps of:
   I) providing a metal value extraction circuit consisting of a first, a second and a third extraction stage, a metal-containing aqueous leach solution feed to the first extraction stage, and a single stripping stage, wherein the extraction stages include a separation apparatus, and wherein the circuit optionally includes a washing or scrubbing stage;
   II) in the first extraction stage, contacting the aqueous leach solution with a partially metal-loaded organic extraction solution from the second extraction stage to extract metal values from the aqueous leach solution;
   III) separating the metal-loaded organic extraction solution from the partially metal-depleted aqueous leach solution resulting from step II);
   IV) passing the metal-loaded organic extraction solution from step III) to a single stripping stage to transfer the metal values to an aqueous stripping solution which is passed to a metal recovery apparatus and to provide a stripped organic extraction solution for reuse in the extraction circuit;
   V) in the second extraction stage, contacting the partially metal-depleted aqueous leach solution from step UT) with a partially metal-loaded organic extraction solution from the third extraction stage to further extract metal values from the partially metal-depleted aqueous leach solution;
   VI) separating the partially metal-depleted aqueous leach solution from the partially metal-loaded organic extraction solution resulting from step V);
   VII) in the third extraction stage, contacting the partially metal-depleted aqueous leach solution from step VI) with the stripped organic extraction solution from step IV) to extract additional metal values from the aqueous leach solution from step VI;
   VIII) separating the depleted aqueous leach solution from the partially metal-loaded organic extraction solution resulting from step VII); DC) removing the depleted aqueous leach solution from step VIII) from the extraction circuit and passing the partially metal-loaded organic extraction solution from step VIII) to the second extraction stage.

7. The process of claim 6, wherein in step I) the metal value in the metal-containing aqueous leach solution comprises copper.

8. The process of claim 6, wherein in step I) the metal value in the metal-containing aqueous leach solution comprises nickel.

9. The process of claim 6, wherein the extraction reagent used in the process comprises an alkylated hydroxyoxime.

10. The process of claim 9, wherein the extraction agent comprises an alkylated, acetophenone oxixne, an alicylated salicylaldoxinie or a mixture thereof.

11. The process of claim 10, wherein the extraction agent comprises 5-nonyl-2-hydroxyaceropheaone oxime, 5-nonyl-salicylaldoxirne, 5-dodecylsalicylaldoxime or a mixture of two or more of them.

12. The process of claim 6, further comprising at least one wash or scrubbing stage.

13. The method of claim 3 wherein the solvent extraction circuit also comprises a wash or scrubbing stage.

14. The method of claim 5 wherein the metal solvent extraction plant is a copper metal solvent extraction plant.

15. The method of claim 5 wherein the solvent extraction circuit also comprises a wash or scrubbing stage.

* * * * *